United States Patent [19]

Tanaka et al.

[11] Patent Number: 5,292,822
[45] Date of Patent: Mar. 8, 1994

[54] HIGH MOISTURE-ABSORBING AND RELEASING FIBERS AND PROCESS FOR PRODUCING THE SAME

[75] Inventors: Koji Tanaka; Kazutoshi Muta, both of Okayama, Japan

[73] Assignee: Toyo Boseki Kabushiki Kaisha, Osaka, Japan

[21] Appl. No.: 973,386

[22] Filed: Nov. 10, 1992

[30] Foreign Application Priority Data

Nov. 11, 1991 [JP] Japan .................... 3-322454

[51] Int. Cl.$^5$ .................................. C08F 8/30
[52] U.S. Cl. .......................... 525/329.1; 525/329.2; 525/329.3; 525/367; 525/368; 525/369; 525/370; 525/371; 525/372; 525/373; 525/376; 8/115.65
[58] Field of Search ............... 525/329.1, 329.2, 329.3; 8/115.65

[56] References Cited

U.S. PATENT DOCUMENTS 4,943,618  7/1990  Stoy et al. .................. 525/329.1
5,054,659  10/1991  Gregor et al. .............. 525/329.1

*Primary Examiner*—Bernard Lipman
*Attorney, Agent, or Firm*—Wegner, Cantor, Mueller & Player

[57] ABSTRACT

High-moisture absorbing and releasing fibers which have moisture-absorbing properties and moisture-releasing properties, are resistant to repetitive use, and have both flame resistance and antibacterial properties and a process for producing the same are provided.

Acrylic fibers in which increase in nitrogen content by hydrazine cross-linking, an amount of salt type carboxyl groups and amido groups by modification of nitrile groups, tensile strength, LOI and sterilization rate are specifically adjusted. Such the fibers are obtained by hydrazine cross-linking treatment, hydrolysis treatment and conversion of the carboxyl groups to the salt type.

High-moisture absorbing and releasing fibers having excellent processability in addition to flame resistance and antibacterial properties are obtained. Such the fibers can also be used repeatedly.

5 Claims, No Drawings

HIGH MOISTURE-ABSORBING AND RELEASING FIBERS AND PROCESS FOR PRODUCING THE SAME

FIELD OF THE INVENTION

The present invention relates to moisture-absorbing and releasing fibers which can reversibly absorb and release the moisture and are resistant to repetitive use and a process for producing the same.

BACKGROUND OF THE INVENTION

As means to remove the moisture in air, there have been hitherto used moisture absorbents such as lithium chloride, calcium chloride, magnesium chloride, phosphorus pentaoxide and the like. Although these moisture absorbents absorb the moisture in a large amount and rapid manner, they have deliquescence and therefore have such the defects that, after absorption, they are liquified to contaminate the other materials, and are difficult to be molded and regenerated.

On the other hand, moisture absorbents such as silica gel, zeolite, sodium sulfate, activated alumina, activated carbon and the like have such the defects that they absorb the moisture in a small amount and slow manner and requires high temperature for regeneration. Therefore, all moisture absorbents described-above have the problems for a variety of practical use.

As means to solve these problems, there are provided means in which a mixture of water-absorbing resin and deliquescent salts is used [JP-A 52-107042 and JP A 63-31522].

However, since the moisture absorbents are dispersed on a sheet, nonwoven cloth or the like, inserted in or wrapped by them in order to use the absorbents in a form of sheet, nonwoven cloth or the like, there are such the problems that the moisture absorbents are easily fallen therefrom, the sufficient absorbing ability can not be obtained, and laborious steps are required for processing the absorbents in the above form.

As means to solve the problems, impregnation of deliquescent salts in high water-absorbing fibers has been proposed in JP-A 1-299624. The fibers obtained by the means have such the practical ability that they are easily processed into knitted, woven or nonwoven cloth or the like, rapidly absorb and release the moisture and further the moisture absorbent are not fallen from them. However, since the surface of the fibers are hydrogels, they become adhesive when they absorb the moisture and therefore can hardly be applied, in particular, to wall paper and wadding and do not satisfy with flame resistance and antibacterial properties, the needs for which have recently been socially increased.

OBJECTS OF THE INVENTION

The main object of the present invention is to provide high-moisture absorbing and releasing fibers which absorb the moisture in a large amount, rapidly absorb and release the moisture, are easy to be handled, are easily processed into a variety of forms, have the excellent form retaining properties after absorption of the moisture, are easily regenerated and have flame resistance and antibacterial properties, as well as a process for producing the same.

This object as well as other objects and advantages of the present invention will become apparent to those skilled in the art from the following description.

SUMMARY OF THE INVENTION

The above objects of the present invention can be accomplished by high-moisture absorbing and releasing fibers which comprises cross-linked acrylic fibers having 1.0 to 8.0 % by weight increase in nitrogen content by hydrazine cross-linking, wherein 1.0 to 4.5 mmol/g of salt type carboxyl groups are introduced in a part of the remaining nitrile groups and amino groups are introduced in the remainder thereof, said fibers having not lower than 1 g/d of tensile strength, not less than 24 of limit oxygen index and not less than 90% of sterilization rate and a process of claim 6. Sterilization rate as used herein for estimating the antibacterial properties is by shaking flask method described below.

The present invention has the special effect in that there are provided high-moisture absorbing and releasing fibers which maintain the fiber properties having no practical problems and have both flame resistance and antibacterial properties as well as an industrially advantageous process for producing the same.

The high-moisture absorbing and releasing fibers thus obtained, due to high intermolecular cross-linking, do not become sticky after absorption of the moisture, can be easily regenerated by drying after saturation absorption and therefore can be repeatedly used.

Additionally, the fibers of the present invention have high general-purpose properties due to both flame resistance and antibacterial properties. Further, since the fibers of the present invention can be processed into a variety of forms such as nonwoven, knitted or woven cloth due to fibrous form, they can be employed in a field where moisture absorbing and releasing properties are required.

DETAILED DESCRIPTION OF THE INVENTION

The present invention comprises cross-linked acrylic fibers. As the starting acrylic fibers, there are fibers made of acrylonitrile (referred to as AN hereinafter) polymer containing not less than 40% by weight of, and preferably not less than 50% by weight of AN. The fibers may be in any form such as staple, tow, thread, knitted or woven cloth, nonwoven cloth or the like. Further, they may be intermediate product or waste fibers. AN polymers may be AN homopolymers, copolymers with other monomers. As other monomers, there are halogenated vinyl and halogenated vinylidene; methacrylic ester; sulfonic acid containing mononer and salt thereof such as methallylsulfonic acid, p-styrenesulfonic acid and the like; carboxylic acid containing mononer and salt thereof such as methacrylic acid, itaconic acid and the like; other mononers such as acrylamide, styrene, vinyl acetate and the like.

As a method for introducing hydrazine cross-linking in the acrylic fibers, any method which can adjust the increase in nitrogen content to 1.0 to 8.0 % by weight can be employed, and a method of treatment at the concentration of 6 to 80% and at a temperature of 50° to 120° C. for 1 to 5 hours is preferable in industrial point of view. The increase in nitrogen content used herein is the difference between nitrogen content of raw material acrylic fibers and that of hydrazine cross-linked acrylic fibers.

When the increase in nitrogen content is below the above lower limit, the fibers having the practically satisfying physical properties can not be finally obtained, and further flame resistance and antibacterial properties can not be obtained. When the increase in nitrogen content exceeds the upper limit, the high-moisture absorbing properties can not be finally obtained. As hydrazine to be used, there are hydrazine hydrate, hydrazine sulfate, hydrazine hydrochloride, hydrazine nitrate, hydrazine hydrobromide and the like.

As a method for substantially removing the remaining hydrazine uncross-linked nitrile groups by hydrolysis and introducing 1.0 to 4.5 mmol/g of salt type carboxyl groups therein and introducing amido groups in the remainder thereof, there is a method by impregnating therein an aqueous basic solution of alkali metal hydroxide, ammonia and the like, or an aqueous mineral acid such as nitric acid, sulfuric acid, hydrochloric acid and the like, or dipping the raw fibers in the above aqueous solution, and then heat-treating the fibers in impregnated state or dipped state. Alternatively, hydrolysis reaction may be carried out at the same time with the above-described introduction of cross-linking. When hydrolysis is carried out by using an acid, the carboxyl groups need to be converted to salt type.

As a method for converting carboxyl groups to salt type, a method by dipping the above-described hydrolyzed fibers in an aqueous solution of hydroxide or salt of a variety of salt types described below, washing with water and drying them can be suitably employed. As salt types of carboxyl group, there are cationic ion of alkali metals such as Li, Na, K and the like, alkaline earth metals such as Be, Mg, Ca, Ba and the like, other metals such as Cu, Zn, Al, Mn, Ag, Fe, Co, Ni and the like, $NH_4$, amine and the like.

When an amount of salt type carboxyl groups is below the above lower limit, high-moisture absorbing and releasing properties can not be obtained. On the other hand, when an amount of salt type carboxyl groups exceeds the above upper limit, practically satisfying fibers properties can not be obtained. Of course, more than one salt types may be mixed.

By these methods, there can be provided high-moisture absorbing and releasing fibers having not less than 1 g/d of, preferably not less than 1.5 g/d of tensile strength, rapid moisture absorbing and releasing rate, and both flame resistance and antibacterial properties. When particularly high tensile strength is desired, it is preferred that the fibers having high dichroism ratio are selected as the starting acrylic fibers as described below.

In addition, a method by carrying out the respective reactions of filling the acrylic fibers in a container equipped with pumping circulation system, introduction of the above-described cross-linking bond therein, hydrolysis, and formation of a salt is desirable in view of apparatus, safety, uniform reactivity and the like. As a representative example of such the apparatus (a container equipped with pumping circulation system), there is Over Meyer dyeing machine.

In order to provide the fibers having the fibers properties with no practical problems and high-moisture absorbing and releasing properties, it is preferable to employ the starting acrylic fibers having, in particular, the properties described below.

That is, it is desirable that the acrylic fibers in which AN polymers are well oriented and Congo red (referred to as CR hereinafter) dichroism ratio is not less than 0.4 and more preferably not less than 0.5 are employed. CR dichroism ratio means the ratio obtained by the method described in Kobunshikagaku, 23 (252) 193 (1966).

A process for producing such the acrylic fibers is not limited, and known methods can be conveniently used as far as the above-described dichroism ratio is satisfied. Among them, employment of method where total draw rate is not less than 6, preferably not less than 8, and total shrinkage in process based on after the hot-water drawn is not more than 30%, preferably not more than 20% can industrially-advantageously afford the desired acrylic fibers.

Further, dispersibility of the fibers in the reaction solution, permeability of the reaction solution in the fibers and the like are improved by starting from acrylic fibers which have been drawn and, however, not yet subjected to heat treatment (those obtained by spinning a spinning dope of AN polymer according to a conventional method, and drawing it in oriented state and, however, not carrying out heat treatment such as dry heat densification, wet heat relaxation treatment and the like, among them, water-swollen gel-like fibers after wet or dry/wet spinning and drawing: degree of water-swelling 30 to 150%). The employment of such the fibers is desirable since introduction of cross-linking bond and hydrolysis reaction proceed rapidly and uniformly. It goes without saying that degree of water-swelling is percentage of an amount of contained or free water represented based on weight of dry fibers.

The reasons why the high-moisture absorbing and releasing fibers of the present invention have not only flame resistance and antibacterial properties but also high moisture absorbing and releasing properties are not well elucidated, however, can be generally considered as follows.

That is, although the fibers pertaining to the present invention are started from AN polymer, they are substantially lost in nitrile groups. Therefore, side chains which bond to polymer chains are considered to have the cross-linking structure containing a nitrogen generated by a reaction with hydrazine and salt type carboxyl groups generated by hydrolysis of nitrile groups.

Generally speaking, the salt type carboxyl groups have the moisture absorbing properties. However, high moisture-absorbing properties can not be obtained only by the amount of such the groups. It is considered that the cross-linking structure makes a contribution to the moisture-absorbing properties. It is deduced that antibacterial properties is due to the cross-linking structure containing a nitrogen. Further, the absence of sticky feeling after absorption would be due to high cross-linking.

In addition, processing properties would be greatly derived from the oriented structure which is observed in CR dichroism ratio.

EXAMPLE

The following Examples illustrate the present invention in detail. Part and percentage are based on the weight unless otherwise indicated.

An amount of salt type carboxyl groups (mmol/g), LOI (limit oxygen index), coefficient of moisture absorption and antibacterial properties were obtained according to the following method.

(1) An amount of salt type carboxyl groups (mmol/g)

About 1 g of well dried test fibers were weighed precisely (X g), 200 ml of water was added thereto, 1N aqueous hydrochloric acid was added to adjust pH to 2 while warming to 50° C., and the titration curve was obtained with 0.1N aqueous sodium hydroxide according to a conventional method. From the titration curve, an amount of aqueous sodium hydroxide (Y cc) which was consumed by carboxyl groups was obtained, and an amount of carboxyl groups was calculated according to the following formula.

*Amount of carboxyl groups* $= (0.1Y)/X$

Separately, the titration curve was obtained similarly without adjusting pH to 2 by addition of 1N aqueous hydrochloric acid in the operations for determining an amount of carboxyl groups, and an amount of carboxylic acid was obtained.

From these results, an amount of salt type carboxyl groups was calculated according to the following formula.

*(Amount of salt type carboxyl groups)* $=$ *(Amount of carboxyl groups)* $-$ *(Amount of carboxylic acid)*

(2) LOI

LOI was determined according to the method for determining minimum oxygen index described in JIS-K7201.

(3) Coefficient of moisture absorption (%)

About 5.0 g of sample fibers is dried at 120° C. for 5 hours in a hot air drier, and the weight is determined (W1 g). The sample is then placed in a predetermined humidistat at 20° C. for three weeks. The weight of thus moisture-absorbed sample is weighed (W2 g). From the above results, coefficient of moisture absorption was calculated according to the following formula.

*Coefficient of moisture absorption* $= \{(W2-W1)/W1\} \times 100$ (4) Antibacterial properties Using Pneumobacillus as test bacterium, the test was carried out according to shaking flask method of process effect estimating test manual of antibacterial or deodorant processed product (Seniseihin Eisei Kako Kyogikai, 1988), and the results are shown by sterilization rate%.

EXAMPLE 1

A spinning dope obtained by dissolving 10 parts of AN polymer (limiting viscosity [$\eta$] in dimethylformamide at 30° C.: 1.2) consisted of 90% of AN and 10% of methyl acrylate (referred to as MA hereinafter) in 90 parts of 48% aqueous sodium rhodanite was spun according to a conventional method, drawn (total draw ratio; 10 times), and dried (total shrinkage in process based on after the hot-water drawn 14%) under the atmosphere at dry bulb/wet bulb=120° C./60° C. to obtain raw fibers I (CR dichroism ratio 0.58) having 1.5 d of filament fineness.

Raw fibers I was treated with hydrazine and aqueous NaOH under the conditions shown in Table 1, dehydrated, washed with water, and dried to obtain fibers 1–6. The resulting fibers were tested in properties, and the results thereof are shown in Table 1.

TABLE 1

| Example | Fibers No. | Hydrazine Treatment % | Hydrazine Treatment °C. | Hydrazine Treatment Hr | NaOH Treatment % | NaOH Treatment °C. | NaOH Treatment Hr | Increase in nitrogen content (%) | Amount of Na type carboxyl groups (mmol/g) | Coefficient of moisture absorption (RH 65%) (%) | Flame Resistance (LOI) | Tensile strength (g/d) | Antibacterial sterilization rate (%) |
|---|---|---|---|---|---|---|---|---|---|---|---|---|---|
| Present invention | 1 | 6.4 | 102 | 6 | 5 | 90 | 2 | 1.5 | 4.5 | 55 | 28 | 1.0 | 90 |
| Present invention | 2 | 35 | 103 | 3 | 5 | 90 | 2 | 4.2 | 3.5 | 42 | 26 | 1.5 | 99 |
| Present invention | 3 | 32 | 109 | 3 | 10 | 90 | 3 | 7.2 | 1.0 | 16 | 24 | 1.8 | not less than 99 |
| Comp. example | 4 | 6.4 | 102 | 5 | 10 | 90 | 2 | 0.5 | 6.5 | 60 | 18 | 0.6 | not more than 10 |
| Comp. example | 5 | 6.4 | 102 | 5 | 5 | 90 | 1 | 0.5 | 2.0 | 27 | 19 | 1.2 | not more than 10 |
| Comp. example | 6 | 32 | 109 | 10 | 5 | 90 | 2 | 9.0 | 0.2 | 8 | — | 2.0 | — |

It is understood that the fibers 1–3 of the present invention are high-moisture absorbing fibers having flame resistance and antibacterial properties as well as excellent fibers physical properties.

On the contrary, the fibers 4 of Comparative Example having lower increase in nitrogen content by hydrazine treatment had high-moisture absorbing properties. However, they had no antibacterial properties and had as low as 0.6 g/d of tensile strength. Therefore, they were brittle fibers and had no physical properties which are resistant to processing such as card treatment and the like.

The fibers 5 of Comparative Example having lower increase in nitrogen content, however, and an amount of sodium type carboxyl groups of 2 mmol/g by hydrolysis had 1.2 g/d of tensile strength and high coefficient of moisture absorption, however, had no antibacterial properties.

The fibers 6 of Comparative Example having higher increase in nitrogen content had lower coefficient of moisture absorption.

EXAMPLE 2

5 g Of No. 2 fibers obtained in Example 1 were dipped in 1 liter of 5% aqueous solution of the salt shown in Table 2 at 40° C. for 5 hours, washed with water, and dried to obtain the fibers 7–10 having different salt type. The resulting fibers were tested for physical properties and the results thereof are shown in Table 2.

TABLE 2

| Fibers No. | Kind of salt | Amount of salt type carboxyl groups (mmol/g) | Coefficient of moisture absorption RH 65% (%) | Flame resistance (LOI) | Tensile strength (g/d) | Antibacterial sterilization rate (%) |
|---|---|---|---|---|---|---|
| 7 | CuSO₄ | 3.4 | 21 | 34 | 1.4 | not less than 99 |
| 8 | ZnSO₄ | 3.6 | 26 | 34 | 1.3 | not less than 99 |
| 9 | CaCl₂ | 3.5 | 30 | 29 | 1.3 | 91 |
| 10 | LiCl₂ | 3.5 | 47 | 25 | 1.3 | 93 |

All salt type fibers were highmoisture absorbing and releasing fibers having both antibacterial properties and flame resistance.

EXAMPLE 3

1 g Of No. 2 fibers obtained in Example 1 were allowed to stand at 90% of humidity for 24 hours in a humidistat. Thereafter, the sample was allowed to stand at 65% of humidity for 1 hour, at 45% of humidity for 1 hour, and at 10% of humidity for 1 hour. Like these, the humidity was successively descended to study the moisture releasing properties of high-moisture absorbing and releasing fibers. The results are shown in Table 3.

TABLE 3

| Humidity (%) | Coefficient of moisture absorption (%) |
|---|---|
| 90 | 58 |
| 65 | 42 |
| 45 | 29 |
| 10 | 7 |

From the results, it is understood that the fibers of the present invention have the excellent moisture releasing properties.

EXAMPLE 4

Raw fibers II (CR dichroism ratio 0.55) were obtained according to the same manner as that in Example 1 except that vinylidene chloride was used in stead of MA, and the resulting fibers were treated according to the same manner that in No. 2 fibers in Example 1.

The resulting fibers were high-moisture absorbing and releasing fibers having 3.8% of increase in nitrogen content, 3.5 mmol/g of salt type carboxyl groups, 43% of coefficient of moisture absorption at relative humidity 65%, 29 of LOI, 93% of sterilization rate, 1.6 g/d of tensile strength, as well as both flame resistance and antibacterial properties.

What is claimed is:

1. High-moisture absorbing and releasing fibers which comprises cross-linked acrylic fibers having 1.0 to 8.0 % by weight increase in nitrogen content by hydrazine cross-linking, wherein 1.0 to 4.5 mmol/g of salt type carboxyl groups are introduced in a part of remaining nitrile groups and amido groups are introduced in the remainder.

2. High-moisture absorbing and releasing fibers according to claim 1, wherein the cross-linked fibers are fibers formed from starting acrylic fibers, acrylonitrile polymer containing not less than 40% by weight of acrylonitrile.

3. High-moisture absorbing and releasing fibers according to claim 2, wherein dichroism ratio of the starting acrylic fibers is not less than 0.4.

4. High-moisture absorbing and releasing fibers according to claim 2, wherein the starting acrylic fibers are fibers which are not heat-treated after drawing.

5. High-moisture absorbing and releasing fibers according to claim 2, which have not lower than 1 g/d of tensile strength, not less than 24 of limit oxygen index and not less than 90% of sterilization rate.

* * * * *